Jan. 12, 1932.  S. M. DOUGHERTY  1,841,094
CIRCUIT BREAKER SYSTEM
Filed March 3, 1928  3 Sheets-Sheet 1

INVENTOR
Samuel M. Dougherty.
BY
ATTORNEY

Jan. 12, 1932.  S. M. DOUGHERTY  1,841,094
CIRCUIT BREAKER SYSTEM
Filed March 3, 1928  3 Sheets-Sheet 2
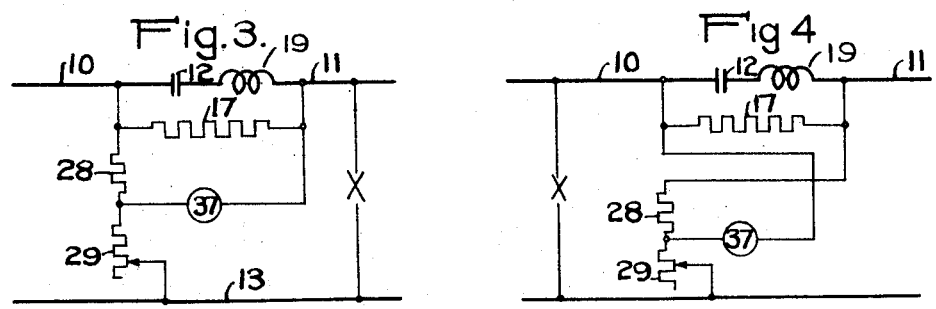
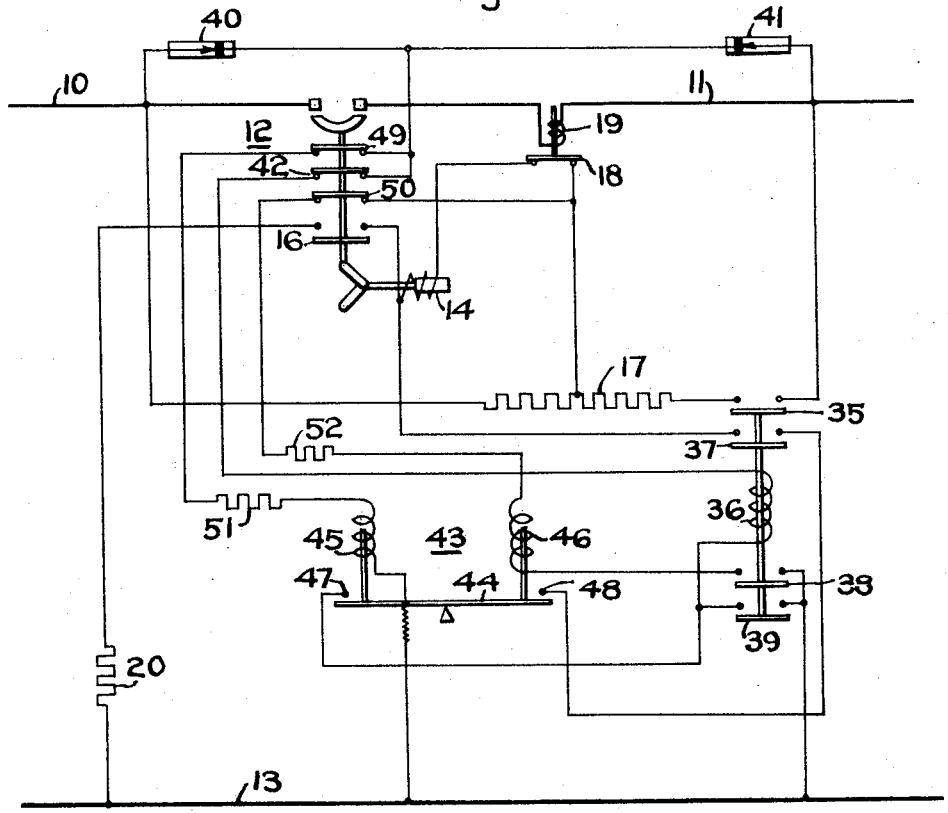
INVENTOR
Samuel M. Dougherty.
BY
ATTORNEY Jan. 12, 1932.  S. M. DOUGHERTY  1,841,094
CIRCUIT BREAKER SYSTEM
Filed March 3, 1928   3 Sheets-Sheet 3
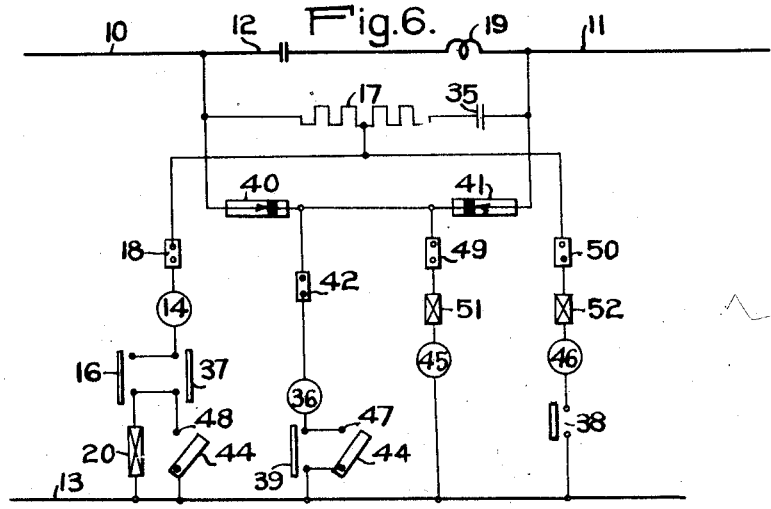
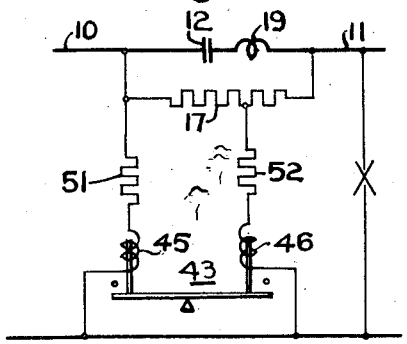
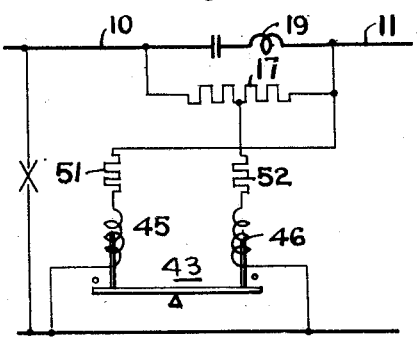
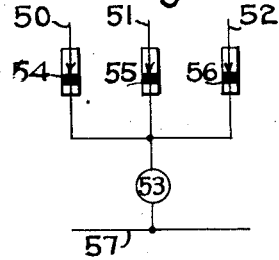
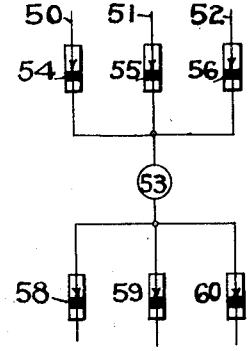
INVENTOR
Samuel M Dougherty.
BY
ATTORNEY Patented Jan. 12, 1932

1,841,094

UNITED STATES PATENT OFFICE

SAMUEL M. DOUGHERTY, OF EAST PITTSBURGH, PENNSYLVANIA, ASSIGNOR TO WESTINGHOUSE ELECTRIC & MANUFACTURING COMPANY, A CORPORATION OF PENNSYLVANIA

CIRCUIT BREAKER SYSTEM

Application filed March 3, 1928. Serial No. 258,892.

This invention pertains to a system for controlling the operation of a reclosing circuit breaker and, more particularly, to a system of the type described in which means are provided for measuring the resistance of a load circuit, to determine whether it is proper to connect the load circuit to a source of supply.

One of the principal objects of my invention is to provide a reclosing circuit breaker system for connecting adjacent sections of a direct-current feeder circuit that shall be responsive to faults in either of the sections of the feeder circuit, such that the circuit breaker shall be automatically opened upon the occurrence of a fault and automatically reclosed when normal conditions are restored on the faulty section, regardless of the location of the fault with respect to the circuit breaker.

Another object of my invention is to provide a reclosing circuit breaker which is controlled by a resistance-measuring means, and to arrange the circuit so that the reclosing mechanism and the resistance-measuring means may be energized from either of the sections connected to the circuit breaker, depending upon the location of the fault with respect thereto.

A further object of my invention is to utilize a Wheatstone bridge or other resistance-measuring circuit, to determine the resistance of a load circuit so that the load circuit may be connected to a source of supply when its resistance is of a predetermined value.

A still further object of my invention is to provide means for establishing connections to the resistance-measuring circuit by means of suitable rectifiers, so that, when a fault occurs on one of the sections connected to the circuit breaker, the resistance-measuring circuit will be immediately connected to the other circuit to measure its resistance, regardless of which of the two sections is faulty.

A still further object of my invention is to provide a reclosing circuit-breaker system adapted to measure the resistance of either of the circuits to which the breaker is connected and to change the connections if the relative potentials of the sections vary so that the resistance-measuring means will always be connected to measure the resistance of the circuit having the lower potential, and so that the energy for reclosing the circuit breaker will always be obtained from the section having the higher potential.

Another object of my invention is to provide means for detecting on which of two feeder sections, connected to a sectionalizing breaker an overload has occurred, by comparing the voltages of the sections.

Another object of this invention is to provide, in a distribution system having a plurality of energy sources, means for supplying a load connected to the system from the source having the highest potential at the same time preventing the flow of a circulating current between said sources, and for changing the source of supply in case of variations in the voltages of the sources, so that the load will always be supplied by the source having the highest potential.

It has previously been proposed to make use of a Wheatstone bridge or other resistance-measuring circuit to determine the resistance of a portion of a distribution system and thereby to control the connection thereof to a source of supply when its resistance reaches a predetermined value. It has also been proposed to arrange such system so that the resistance-measuring circuit may be connected to measure the resistance of either of two adjacent feeder sections. My invention is an improvement on systems of the latter type and one of the novel features thereof is the means employed to control the connection of the resistance-measuring circuit so that it is always connected to measure the resistance of the circuit having the lower potential, taking its energy from the other circuit.

In accordance with my invention, I connect the resistance-measuring circuit to both of the feeder sections which are connected to the circuit breaker, by means of single wave rectifiers or other equivalent unidirectional current-conducting means. Thus, when the potential of one section decreases, as a result of a short circuit or overload, for example, the resistance-measuring means will be so connected as to measure the resistance of the circuit on which the overload occurred.

My invention has certain aspects of a broader scope than the control of a reclosing circuit breaker. By employing the principles which I shall disclose, it is possible to supply any load device from a source having a higher potential than any other source connected to the load device, and yet prevent any interchange of current between the several sources.

For a complete understanding of my invention, reference is made to the accompanying drawings, in which Figure 1 is a diagram of the circuit employing a Wheatstone bridge to measure the resistance of a faulty feeder section;

Figs. 3 and 4 are schematic diagrams showing the circuit connections established in the system of Figs. 1 and 2 when a fault occurs on one or the other of the two feeder sections adapted to be connected by the reclosing circuit breaker;

Figs. 5 to 8 correspond in character with Figs. 1 to 4, except that the resistance-measuring means employed in the figures shown in 5 to 8 is not a Wheatstone bridge but a simple resistance bridge such as is shown in the United States Patent No. 1,498,695; and Figs. 9 and 10 show how the novel features of my invention may be employed to select from a plurality of electrical sources, that source having the highest potential for supplying current to a load device.

Figure 1:
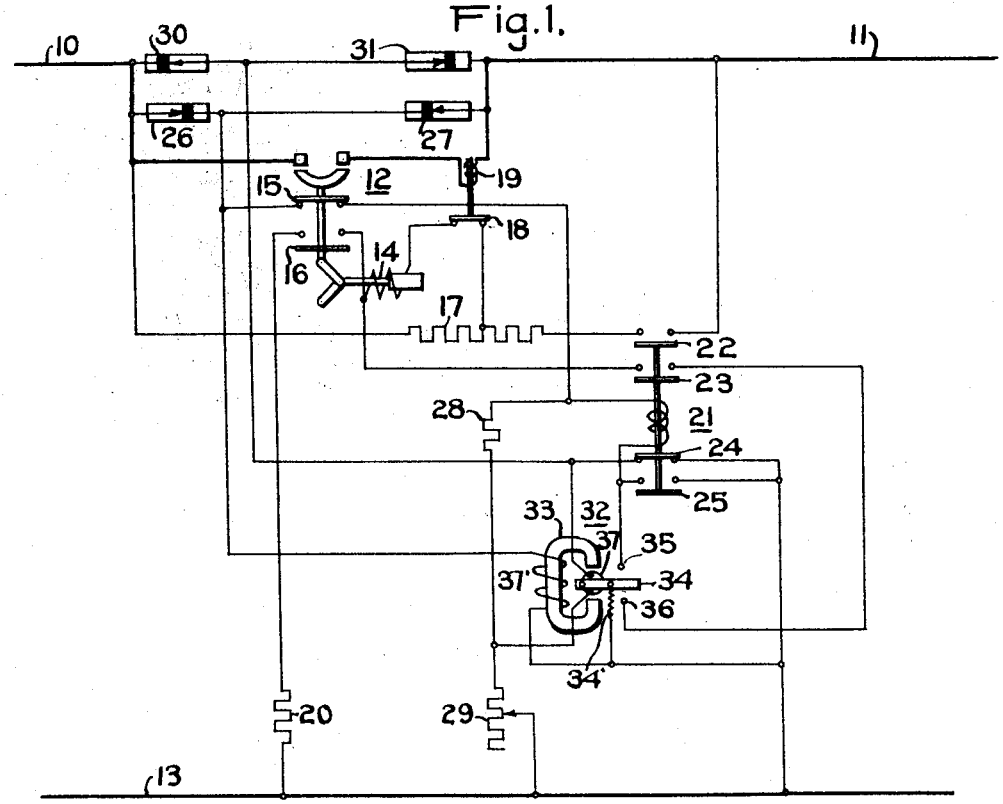

Referring in detail to Fig. 1, two sections 10 and 11 of a direct-current feeder circuit are adapted to be connected by a circuit interrupter 12. The return path for the current supplying the sections 10 and 11 is shown at 13. The circuit interrupter 12 is provided with a closing coil 14 and auxiliary switches 15 and 16. The switch 15 is closed when the circuit breaker is open, whereas the switch 16 is open when the circuit breaker is open.

Under normal operating conditions, the circuit breaker 12 is maintained closed by the energization of its operating coil 14 which is connected in a circuit including a resistor 17, a contact 18 of overload relay 19, contact 16 and a resistor 20. The resistor 17 is connected between the feeder sections 10 and 11 by the contacts 22 of a relay 21.

The relay 21 is also provided with contacts 23, 24 and 25, the functions of which will be pointed out hereafter. The operating coil of the relay 21 may be connected through the contact 15 to the common terminal of two single-wave rectifiers 26 and 27. These rectifiers may be of any suitable type, but I prefer to employ rectifiers of the copper-oxide-disc type, such as are disclosed in the Patent No. 1,640,345 granted to L. O. Grondahl on August 23, 1927. The rectifiers 26 and 27 are connected across the terminals of the circuit breaker 12 in such manner that they will permit the passage of current from either of the feeder sections 10 and 11 to the coil of the relay 21, but not from either section to the other.

For the purpose of setting up a resistance-measuring bridge, I provide two resistors 28 and 29 to co-operate with the resistor 17, which is adapted to be connected across the circuit breaker terminals when the relay 21 operates. The resistors 28 and 29 are connected in series between the common terminal of the rectifiers 26 and 27 and the return conductor 13, through the back contact 15 of the main breaker 12. One terminal of the coil of the relay 21 is also connected to the common terminal of the rectifiers 26 and 27 through the back contact 15 of the breaker 12.

In addition to the rectifiers 26 and 27, I also provide two other single-wave rectifiers 30 and 31 which are likewise connected across the circuit breaker terminals, but in reverse manner with respect to the rectifiers 26 and 27. The rectifiers 26 and 27 control the energization of the resistance-measuring bridge from one section or the other depending upon which is normal. The rectifiers 30 and 31 provide a return path to one section or the other for current supplied to a control relay 32 which responds to the condition of balance or unbalance in the resistance-measuring bridge.

The relay 32 comprises a magnetic circuit 33 which is excited by a winding 37', although a permanent magnet may be substituted for the electromagnet shown. The moving coil 37 of the relay actuates a moving contact 34 into engagement with a front contact 35, when energized by current in one direction. When the moving coil is deenergized, the contact 34 is urged into engagement with a back contact 36 by a spring 34'. The contact 34 is connected to the conductor 13.

It is to be understood that any suitable non-polarized relay having front and back contacts may be substituted for that shown at 32.

Figure 2:
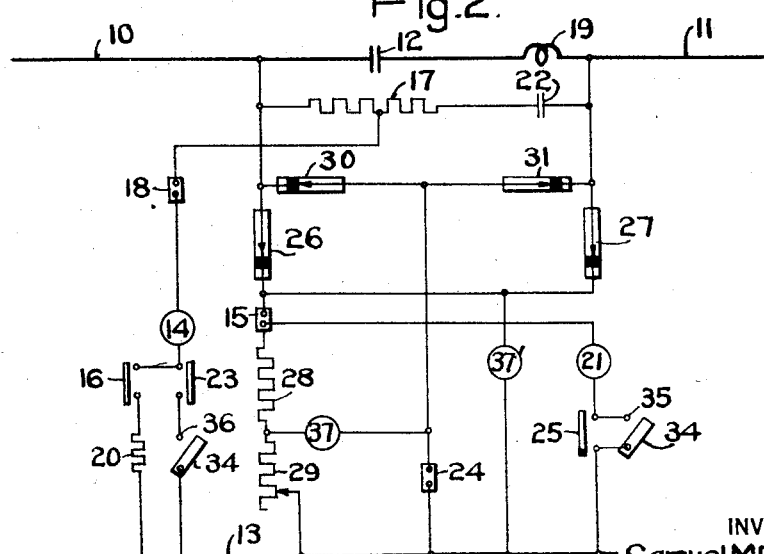
Fig. 2 is a schematic diagram of the circuit shown in Fig. 1.

The apparatus and circuits involved in the system shown in Fig. 1 having been described in detail, the operation of the system will now be explained. Fig. 2 merely shows schematically the complete circuits of Fig. 1.

Assuming that normal conditions exist on both the feeder sections 10 and 11, and that the circuit breaker 12 is closed, the operating coil thereof will be maintained energized since it is connected in a circuit from the section 10 through the resistor 17, contact 18 of the overload relay 19, the operating coil 14, the switch 16 and the resistor 20 to the return circuit 13. Under normal conditions, the relay 21 is de-energized as is also the relay 32. The moving contact 34 of the relay 32 normally engages the fixed contact 36 due to the restraining spring 34'.

If an overload or short circuit occurs on section 11, the overload relay 19 will operate to open its contact 18 to interrupt the circuit to the closing coil 14 of the circuit breaker 12. The circuit breaker 12 is thereupon permitted to open to disconnect the faulty section 11 from the section 10 to prevent the latter from serving as a source of supply for the fault existing in section 11.

The opening of the circuit breaker 12 causes the auxiliary switch 15 thereof to close and thereby connects the common terminal of the resistor 28 and the operating coil of the relay 21 to the common terminals of the rectifiers 26 and 27.

As already pointed out, the rectifiers 26 and 27 are so connected as to permit current to flow from either of the feeder sections 10 and 11 to the circuit including the resistor 28 and to that including the coil of the relay 21. Since the section 11, however, is disconnected from its source of energy, the potential on the section 11 will be substantially zero and, therefore, section 10 alone will serve to supply current through the rectifier 26 to the control circuits. As long as the potential of the section 10 is higher than that of section 11, this condition will persist, but as soon as the potential of the section 11 exceeds that of section 10, the latter will cease to supply any current to the control circuits and the section 11 will thereupon become the source of supply for said control circuits. Thus, by employing the valve action of the single-wave rectifiers 26 and 27, I am enabled to select from a plurality of possible current sources, that having the highest potential, for supplying a load circuit.

Since the potential of the section 10 is higher than that of section 11, current will flow from the former through the rectifier 26, the back contact 15 on the circuit breaker 12, through the resistor 28, the coil 37 of the relay 32, back contact 24 of relay 21 and thence to the return circuit 13. The coil of the relay 32 is so connected that when current flows through the circuit just traced, in the direction indicated, the moving contact 34 will engage the contact 35. This results in the completion of a circuit from the section 10, through rectifier 26, contact 15, operating coil of relay 21, contacts 35 and 34, and thence to the return conductor 13. The coil of the relay 21 being thus energized, the relay operates to close its contacts 22, 23 and 25 and to open the contact 24. The closing of the contact 22 connects the right hand end of the resistor 17 to the section 11. The closing of the contact 23 sets up a reclosing circuit for the coil 14 of the circuit breaker 12 which is completed in a manner to be described later by the return of contact 34 of relay 32 to its initial position against contact 36. The opening of the contact 24 interrupts the circuit above traced including the coil 37 of the relay 32. The closing of the contact 25 completes a locking circuit for the coil of the relay 21 which is thereafter maintained energized regardless of the movements of the contact 34 of the relay 32.

When the operations thus far described have taken place, it may be observed that the resistors 17, 28 and 29 and the load circuit including the load between the conductors 11 and 13 are connected to constitute a Wheatstone bridge to which current is supplied, from the conductors 10 through rectifier 26. The galvanometer relay 32 is connected across a diagonal of the bridge, from the junction point of resistors 28 and 29 to the section conductor 11 through the rectifier 31. The opening of switch 24 by relay 21 has not de-energized winding 37 therefore, and it remains energized to hold contacts 34 and 36 disengaged.

In Fig. 3 the details of the circuit of Fig. 1 are omitted and only the actual connections are shown. In Fig. 3, it will be seen that when the fault occurs between the section 11 and the conductor 13, a resistance-measuring circuit is set up, composed of a Wheatstone bridge of which the resistance of the load circuit is the unknown value to be determined. Obviously, it is possible, by the proper setting of the Wheatstone bridge, which may be accomplished by adjusting the setting of the resistor 29, for example, to cause the relay 32 to close its back contact when the resistance of the load circuit reaches a predetermined value, so that the relay winding 37 will be de-energized.

When these conditions are attained and the contact 36 is engaged by the contact 34, a reclosing circuit is completed as follows:

From the section 10 to the left-hand half of the resistor 17, contact 18 of the overload relay 19, the closing coil 14 of the circuit breaker 12, the contact 23 of the relay 21, contacts 36, 34 and thence to the return conductor 13. The completion of this circuit causes the closing coil 14 to be energized and the circuit breaker 12 is thereupon reclosed.

When the circuit breaker 12 is reclosed, the contact 15 thereof is opened and the circuit to the coil of relay 21 is thereupon interrupted and the coil is de-energized. At the same time, the switch 16 closes its contact to complete a locking circuit for the coil 14 of circuit breaker 12. Thus the circuit breaker is reclosed and the entire system returned to the condition in which it was first assumed to be.

If the fault which causes the operation of the overload relay 19 occurs on the section 10 instead of the section 11 the operations heretofore recited will take place in the same sequence but because of the valve action of the rectifiers utilized, connections will be so made that the Wheatstone bridge will be arranged to measure the resistance of the load on the circuit connected to the conductors 10 and 13. These conditions are illustrated in Figure 4 which is similar to Fig. 3 in that it shows merely the outline of the resistance-measuring circuit when the fault occurs on the section 10. In Fig. 4, it will be seen that the resistors 17, 28 and 29 with the resistance of the circuit connected to the conductors 10 and 13, again constitute a Wheatstone bridge, but here the fourth arm or unknown resistance is that of the load circuit connected to the section 10. When this resistance reaches a predetermined value, the energization of the coil 37 of the relay 32 is so changed that the relay closes its back contact to reclose the circuit breaker in the manner already described.

In Figure 5 is shown a reclosing circuit breaker system similar to that shown in Fig. 1 except that the resistance-measuring means is not a Wheatstone bridge but another resistance-measuring circuit such as that shown in United States Patent No. 1,498,695.

As in Fig. 1, the feeder sections are indicated at 10 and 11, and are adapted to be connected by the circuit breaker 12 when the latter is closed as a result of the energization of its closing coil 14. The resistor 17 is adapted to be connected across the breaker terminals when a contact 35 of a relay 36 is closed.

The relay 36 is also provided with contacts 37, 38 and 39, and the coil of the relay 36 is adapted to be energized by either the section 10 or the section 11 through one of the rectifiers 40 and 41 through a circuit including an auxiliary contact 42 on the circuit breaker 12.

The operation of the relay 36 and of the circuit breaker 12 is controlled by a resistance-measuring relay 43. This relay is composed of a balanced lever arm 44 which is actuated by solenoids 45 and 46 operating on suitable core members connected to the balanced arm 44. The arm 44 is connected to the return circuit 13 and is adapted to engage contacts 47 and 48.

The circuit breaker 12 is also provided with an auxiliary contact 49 which is adapted to connect the coil 45 of the relay 43 to the common terminal of the rectifiers 40 and 41 in series with a resistor 51. A switch 50 on the breaker connects the coil 46 and a resistor 52 in series therewith to the mid point of the resistor 17.

In all other respects, the system shown in Fig. 5 is similar to that shown in Fig. 1 and the operation thereof may be described as follows:

Under normal conditions, the circuit breaker 12 will be closed, and the overload relay 19 de-energized. The auxiliary relay 36 will also be de-energized and the relay 43 will be in a neutral position.

If an overload occurs on the section 11, the overload relay 19 will operate to interrupt the circuit to the closing coil of the circuit breaker 12 which is thereby opened. The contacts 49 of the circuit breaker 12 connects the coil 45 to the common terminals of the rectifiers 40 and 41 and the contact 50 connects the coil 46 to the mid-point of resistor 17. The circuit including the coil 45 is completed by the conductor joining the member 44 to the return conductor 13, and the balanced arm 44 is thereupon actuated to engage the contact 47.

The engagement of the contact 47 by the arm 44 completes a circuit from the common terminals of the rectifiers 40 and 41 through the back contact 42 on the circuit breaker 12 through the operating coil of the relay 36, contact 47, the arm 44 and thence to the return conductor 13.

The relay 36 is thereby operated to close its contacts 35, 37, 38 and 39. The closing of the contact 35 connects the resistor 17 across the terminals of the circuit breaker 12. The closing of the contact 37 sets up a reclosing circuit for the closing coil of the circuit breaker 12 which will be completed, in a manner to be described hereafter, when the relay 43 operates. The closing of the contact 38 completes a circuit from the mid point of the resistor 17 through the back contact 50 of the circuit breaker 12, resistor 52, coil 46, contact 38 and thence to return conductor 13. The coil 46 is thereby energized by current from the supply section 10 in proportion to the potential drop across the right hand half of the resistor 17 plus the potential drop across the load circuit 11—13. The energization of the coil 46 is proportional, therefore, to the potential across the fault or overload. At the same time, the coil 45 is energized by the voltage existing across the supply circuit 10—13.

As long as the resistance of the overload is low, the energization of the coil 46 will be insufficient to cause engagement of the contact 48 by the arm 44, since the voltage across the coil is proportional to the resistance of the fault. When the resistance of the load circuit increases to a predetermined value, however, the potential across the load circuit 11—13 is likewise increased and the voltage across the coil 46 is similarly increased so that when the load circuit attains a resistance of a predetermined value, the coil 46 overcomes coil 45 and causes the arm 44 to engage the contact 48. The disengagement of contact 47 does not affect relay 36 since it completed a locking circuit for itself through contact 39.

When the arm 44 engages the contact 48, the reclosing circuit previously mentioned, including the closing coil 14 of the circuit breaker 12 and contact 37 of the relay 36, is completed and the circuit breaker is reclosed.

When the breaker is closed the contacts 49 and 50 open the circuits to the coils 45 and 46 and the contact 42 interrupts the circuit to the coil of the relay 36 so that all the control apparatus returns to the condition which it originally occupied.

Fig. 6 illustrates a schematic diagram of the circuit shown in Fig. 5 and since the above description of the circuit and its method of operation may be read in connection with Fig. 6, it is not repeated.

Fig. 7 illustrates the circuit conditions existing when the circuit breaker 12 has been opened as a result of an overload on section 11. It is apparent from an examination of Fig. 7 that the coil 46 is connected across a portion of the resistor 17 and the load circuit so that it is subject to a potential equivalent to the sum of the potentials across that portion of the resistor 17 and the load circuit. It appears also, that the coil 45 is connected directly across the supply circuit 10. As already described, when the potential across the load circuit 11—13 rises to a predetermined value indicating that the resistance of the load circuit has increased correspondingly, the balance relay 43 is operated to close the circuit to the closing coil of the circuit breaker 12.

Fig. 8 shows the conditions existing in the circuit when a fault occurs on section 10 instead of section 11. Because of the valve action of the rectifiers 40 and 41, the coil 45 of the relay 43 is again connected across the supply circuit 11—13. At the same time, the coil 46 is connected directly across the load circuit 10—13 and a portion of the resistor 17.

It is obvious from the description heretofore given, that the use of single-wave rectifiers as electrical valves makes possible the automatic connection of a resistance-measuring device so as to measure the resistance of the feeder section having the lower potential, by means of current supplied from the other section so that, regardless of the location of the fault, connections are always made so that resistance-measuring device is connected to the faulty section to complete the circuit-breaker-reclosing circuit when the resistance of the faulty circuit has increased to its normal value.

In Fig. 9, I show how my invention may be applied to the problem of selecting from a plurality of electrical sources that which has the highest potential for the operation of any desired load device. In Fig. 9, three electrical sources are indicated at 50, 51 and 52. A load device 53, which may be of any character whatever, is connected to the three electrical sources through single wave rectifiers 54, 55 and 56. A return circuit for the three sources is shown at 57. The characteristics of the rectifiers 54, 55 and 56 are such that current will be supplied to the load device 53 by the source having the highest potential, and at the same time, circulating current between the several sources will be prevented. Thus, if the source 50 has a potential higher than either of the sources 51 and 52, the source 50 will then tend to send current through the load device 53 and at the same time through the rectifiers 55 and 56 to the sources 51 and 52. Since the rectifiers 55 and 56 will conduct current only in the direction indicated by the arrows, no current will flow from the source 50 to either of the sources 51 or 52 but at the same time, the load 53 will be supplied with current from the source 50. Should the relative potentials of the various sources be changed by any occurrence, the source having the highest potential will still supply energy to the load without causing any circulating current to the other sources.

Fig. 10 illustrates a similar system except that instead of employing a common return circuit 57, the return circuits are independent. This necessitates the use of additional rectifiers 58, 59 and 60 in each of the individual return circuits. The operation of the system shown in Fig. 10 is identical with the arrangement shown in Fig. 9 and it is, therefore, not repeated.

It will be apparent to those skilled in the art that I have provided a novel circuit-breaker-reclosing system which functions in such a manner as to measure the resistance of a faulty feeder section regardless of which side of the circuit interrupter the fault is on. While other means have been previously proposed for the accomplishment of this object, this system is believed to present numerous advantages over those previously suggested, as already pointed out.

Since changes and modifications in the system of my invention will doubtless occur to those skilled in the art, I do not care to be limited to the exact embodiments of my invention shown and described except as indicated in the appended claims.

I claim as my invention:

1. In a reclosing circuit-breaker system, two feeder sections, a circuit breaker for connecting said sections, means for opening the circuit breaker on the occurrence of an overload on either section, means for setting up a resistance-measuring circuit upon the opening of said circuit breaker, and means for connecting said circuit to measure the resistance of the section having the lower potential.

2. In a reclosing circuit-breaker system, two feeder sections, a circuit breaker for connecting the sections, means for opening the circuit breaker when either section is overloaded, a resistance-measuring circuit associated with said system, and means for connecting said circuit only to the feeder section having the higher potential, to measure the resistance of the section having the lower potential.

3. In a reclosing circuit-breaker system, two feeder sections, a circuit breaker for connecting said sections, means for opening the circuit breaker on the occurrence of an overload in either section, a resistance-measuring circuit associated with the system for measuring the resistance of either section by means of energy derived from the other section, and means for controlling the connection of said measuring circuit whereby, when the circuit breaker is opened, the measuring circuit is connected to the section having the higher potential to measure the resistance of the section having the lower potential.

4. The combination in a reclosing circuit-breaker system with a plurality of feeder sections and a circuit breaker for connecting them, of a resistance-measuring circuit for controlling the reclosing of the said circuit breaker, and means for connecting the circuit only to the non-faulty section to measure the resistance of the faulty section, upon the opening of the breaker in response to a fault on either section.

5. A reclosing circuit interrupter system comprising two feeder sections normally connected by a circuit interrupter, means for opening the interrupter upon the occurrence of an overload in either of said sections, and means for simultaneously connecting a resistance-measuring circuit to both of said sections through unidirectional current-conducting means, whereby the circuit is energized from the section having the higher voltage, to measure the resistance of the other section.

6. In a reclosing circuit interrupter system, the combination with a plurality of feeder circuits normally connected by a circuit interrupter, and means for opening the interrupter upon the occurrence of an overload on either section, of a resistance-measuring circuit, a relay in said measuring circuit for causing the reclosing of said interrupter when the resistance of the faulty feeder increases to a predetermined value, and unidirectional current-conducting means connected between said sections and said circuit, whereby the latter is always connected so as to be energized from the non-faulty feeder to measure the resistance of the faulty feeder, regardless of the location of the fault.

7. The combination with two sections of a distribution circuit, a circuit interrupter normally connecting said sections, an overload relay for causing the opening of said interrupter when either section is overloaded, of a resistance-measuring circuit and a relay associated therewith for causing the reclosing of said interrupter when the resistance of the overloaded circuit has increased to a predetermined value, and unidirectional current-conducting means connected in said resistance-measuring circuit whereby said circuit is always energized by the non-faulty section to measure the resistance of the overloaded section, regardless of the location of the overload.

8. A circuit-breaker controlling system comprising a circuit interrupter and an overload relay for causing the interrupter to open when an overload exists on either of the feeder sections normally connected by the interrupter, a resistance-measuring circuit including a relay for causing the reclosing of the interrupter when the resistance of the overloaded section is increased to a predetermined value, and unidirectional current-conducting means connected in said resistance-measuring circuit whereby the said circuit is always connected so as to measure the resistance of the overloaded section and to be energized from the other section, regardless of the location of the overload.

9. In a reclosing circuit breaker system, two feeder sections normally connected through a circuit interrupter, an overload relay for causing the interrupter to open on the occurrence of an overload in either of said sections, means for detecting the section on which the overload exists, including unidirectional current-conducting means connected to said sections, and a relay for causing the interrupter to reclose when the resistance of the overloaded section has increased to a predetermined value.

10. The combination, in a reclosing circuit breaker system, with a plurality of feeder sections normally connected through a circuit interrupter, of means for opening the interrupter when any section is overloaded, means for detecting on which of two adjacent sections the overload occurred, said means including rectifier devices connected to both feeder sections, and means energized through one of said rectifier devices for reclosing the interrupter when the resistance of the overloaded section has increased to its normal value.

11. Means for automatically substituting an auxiliary source of electric current for a main source when the voltage of the latter decreases below that of the former, comprising unidirectional current-conducting means connected between both of said sources and the load to be supplied thereby, and means for interconnecting said unidirectional current-conducting means so that either source may supply current to the load depending on which source has the higher voltage.

12. In a distribution system in which a plurality of current sources are adapted to supply the same load, rectifier units connected in the supply circuit from each current source, means connecting the output terminals of the rectifier units for preventing flow of current to the load from all of said sources except the one having the highest potential, and for preventing flow of current from one of said sources to another.

13. The combination, in a distribution system, with a plurality of current sources and a load adapted to be supplied thereby, of unidirectional current-conducting means connected between each current source and the load for preventing the flow of current to said load from all of the sources except the one having the highest potential, said connection being disposed to prevent a circulating current from flowing from any of said sources to another.

In testimony whereof, I have hereunto subscribed my name this 27th day of February, 1928.

SAMUEL M. DOUGHERTY.